(12) United States Patent
Wisniewski

(10) Patent No.: US 12,290,206 B2
(45) Date of Patent: May 6, 2025

(54) PIZZA OVEN ASSEMBLY FOR DRUM SMOKER

(71) Applicant: Weber Knapp Company, Jamestown, NY (US)

(72) Inventor: Michael Gregory Wisniewski, North East, PA (US)

(73) Assignee: Weber Knapp Company, Jamestown, NY (US)

( * ) Notice: Subject to any disclaimer, the term of this patent is extended or adjusted under 35 U.S.C. 154(b) by 1099 days.

(21) Appl. No.: 17/192,007

(22) Filed: Mar. 4, 2021

(65) Prior Publication Data

US 2022/0279963 A1 Sep. 8, 2022

(51) Int. Cl.
*A47J 37/06* (2006.01)
*A47J 37/07* (2006.01)

(52) U.S. Cl.
CPC ....... *A47J 37/0658* (2013.01); *A47J 37/0664* (2013.01); *A47J 37/0763* (2013.01); *A47J 37/0786* (2013.01)

(58) Field of Classification Search
CPC . A47J 37/0763; A47J 37/0664; A47J 37/0658
See application file for complete search history.

(56) References Cited

U.S. PATENT DOCUMENTS

| | | | | |
|---|---|---|---|---|
| 4,403,540 A | * | 9/1983 | Erkelenz | A47J 37/0611 |
| | | | | 99/425 |
| 4,777,927 A | * | 10/1988 | Stephen | A47J 37/0713 |
| | | | | 126/25 R |
| 4,909,235 A | * | 3/1990 | Boetcker | A47J 37/0704 |
| | | | | 126/25 C |
| 5,222,475 A | * | 6/1993 | Greener | A47J 37/0713 |
| | | | | 126/41 R |
| 5,297,534 A | * | 3/1994 | Louden | A47J 37/0763 |
| | | | | 126/30 |
| 5,315,922 A | * | 5/1994 | Keller | A47J 36/06 |
| | | | | 99/422 |
| 5,365,833 A | * | 11/1994 | Chen | A47J 37/01 |
| | | | | D7/354 |
| 5,365,834 A | * | 11/1994 | Sidoti | A47J 37/108 |
| | | | | 99/450 |
| 5,404,795 A | * | 4/1995 | Coble | A47J 37/0704 |
| | | | | 99/345 |
| D365,724 S | * | 1/1996 | Yu | D7/366 |
| 5,553,601 A | * | 9/1996 | Parker | A47J 37/0713 |
| | | | | 126/38 |
| 5,586,488 A | * | 12/1996 | Liu | A47J 37/0658 |
| | | | | 219/400 |
| 5,678,531 A | * | 10/1997 | Byers | A47J 37/0704 |
| | | | | 126/41 R |
| 5,873,300 A | * | 2/1999 | Kuhlman | A47J 36/2477 |
| | | | | 99/422 |

(Continued)

*Primary Examiner* — Sean M Michalski
(74) *Attorney, Agent, or Firm* — Simpson & Simpson, PLLC

(57) ABSTRACT

A pizza oven assembly, including a base including a lateral wall forming a top, a cooking plate arranged on the top, an enclosure assembly hingedly connected to the base, and a basket assembly operatively arranged to hold an energy source to be burned, including at least one hook arranged to removably connect the basket assembly to the base, and arranged within the lateral wall beneath the cooking plate.

4 Claims, 14 Drawing Sheets

(56) References Cited

U.S. PATENT DOCUMENTS

| | | | |
|---|---|---|---|
| 5,909,729 A * | 6/1999 | Nowicke, Jr. | A47J 37/0704 126/25 R |
| 6,000,389 A * | 12/1999 | Alpert | A47J 37/0713 126/41 R |
| 6,104,004 A * | 8/2000 | Ragland | A47J 37/0786 99/450 |
| 6,892,722 B1 * | 5/2005 | Francies, III | A47J 37/0786 126/25 R |
| 7,328,696 B2 * | 2/2008 | Rodriguez | A47J 37/0704 126/30 |
| 7,717,031 B1 * | 5/2010 | Cornfield | A47J 36/16 99/413 |
| 8,893,704 B2 * | 11/2014 | Foster | A47J 37/0786 126/30 |
| 9,289,095 B2 * | 3/2016 | Goff, IV | A47J 37/0704 |
| 9,289,097 B2 | 3/2016 | Contarino, Jr. | |
| D775,489 S * | 1/2017 | Zemel | D7/332 |
| 9,668,615 B2 | 6/2017 | Contarino, Jr. | |
| 9,681,775 B2 | 6/2017 | Contarino, Jr. | |
| D808,208 S * | 1/2018 | Joseph | D7/325 |
| 10,051,997 B2 | 8/2018 | Contarino, Jr. | |
| 10,105,008 B2 * | 10/2018 | Contarino, Jr. | A47J 37/0704 |
| 10,132,502 B2 | 11/2018 | Contarino, Jr. | |
| 10,213,051 B2 * | 2/2019 | Colston | A47J 37/0704 |
| 10,405,699 B2 | 9/2019 | Contarino, Jr. | |
| 10,575,680 B2 * | 3/2020 | Fagg | A47J 37/0786 |
| 10,687,667 B2 * | 6/2020 | Contarino, Jr. | A47J 37/0786 |
| 11,849,884 B1 * | 12/2023 | Martin | A47J 37/0763 |
| 2006/0191528 A1 * | 8/2006 | Spangrud | F24C 3/027 126/275 R |
| 2007/0221191 A1 * | 9/2007 | O'Brien | A47J 37/0713 126/25 R |
| 2007/0277800 A1 * | 12/2007 | Chiang | A47J 37/0704 126/50 |
| 2009/0078246 A1 * | 3/2009 | Leavens | A47J 37/0704 126/39 H |
| 2010/0124596 A1 * | 5/2010 | Nelson | A23L 5/15 426/523 |
| 2011/0214662 A1 * | 9/2011 | Contarino, Jr. | A47J 37/0658 126/25 R |
| 2013/0014743 A1 * | 1/2013 | Glanville | A47J 37/0704 126/25 R |
| 2014/0251160 A1 * | 9/2014 | Contarino, Jr. | A47J 37/0786 99/341 |
| 2015/0027432 A1 * | 1/2015 | Contarino, Jr. | A47J 37/0763 126/25 R |
| 2019/0231123 A1 | 8/2019 | Borovicka | |
| 2023/0112856 A1 * | 4/2023 | Wang | A47J 37/042 99/443 R |
| 2023/0142464 A1 * | 5/2023 | Li | A47J 37/0786 99/339 |

\* cited by examiner

PIZZA OVEN ASSEMBLY FOR DRUM SMOKER

FIELD

The present disclosure relates to smokers and grills, and, more particularly, to a pizza oven assembly for smokers and grills.

BACKGROUND

A barbecue grill or smoker is a device that cooks food by applying heat from below. Many smokers or grills comprise a base, which houses either the gas burners or charcoal, and a lid, also known as a cover or hood. A drum style smoker comprises a drum-shaped base and a lid that freely lifts off and is unconnected to the base. These drum style smokers have increased in popularity due to their low cost and effective heat transfer capabilities. However, current smokers and grills do not have the capacity to cook pizzas.

Thus, there is a long felt need for a pizza oven assembly that can be used as either a smoker or a pizza oven. There is also a long felt need for a pizza oven assembly that, when installed on a drum smoker, transforms it into a pizza oven.

SUMMARY

According to aspects illustrated herein, there is provided a pizza oven assembly, comprising a base including a lateral wall forming a top, a cooking plate arranged on the top, an enclosure assembly hingedly connected to the base, and a basket assembly operatively arranged to hold an energy source to be burned, including at least one hook arranged to removably connect the basket assembly to the base, and arranged within the lateral wall beneath the cooking plate.

In some embodiments, the enclosure assembly comprises a first planar plate, a first curvilinear plate connected to the first plate, a second curvilinear plate connected to the first plate opposite the first curvilinear plate, and a second planar plate connected to the first planar plate, the second planar plate arranged at an angle with respect to the first planar plate. In some embodiments, the enclosure assembly comprises a bottom edge, and in the fully closed position, the bottom edge is spaced apart from the cooking plate. In some embodiments, the pizza oven assembly further comprises a hinge assembly operatively arranged to hingedly connect the enclosure assembly to the base. In some embodiments, the hinge assembly comprises a bracket fixedly secured to the base, a lever fixedly secured to the enclosure assembly, the lever being rotatably connected to the bracket, and at least one spring connecting to the bracket and the lever and imparting a biasing force on the lever in a first circumferential direction. In some embodiments, the hinge assembly further comprises a stopper operatively arranged to prevent the lever from displacing in the first circumferential direction. In some embodiments, the bracket further comprises a plurality of apertures, the spring is connected to the bracket via a tensioner pin, the tensioner pin engaged with one of the plurality of apertures, and the biasing force is adjustable based on which aperture of the plurality of apertures the tensioner pin is engaged with. In some embodiments, the hinge assembly further comprises a bottle opener. In some embodiments, the basket assembly comprises at least one vertical edge and the cooking plate is engaged with the at least one vertical edge. In some embodiments, the basket assembly comprises a partition therein.

According to aspects illustrated herein, there is provided a pizza oven assembly, comprising a drum including a lateral wall forming a top edge, a hinge assembly, including a bracket fixedly secured to the drum, and lever rotatably connected to the bracket, an enclosure assembly fixedly secured to the lever, the enclosure including a planar top plate, a first curvilinear side plate connected to the top plate, a second curvilinear side plate connected to the top plate opposite the first curvilinear side plate, and a planar rear plate connected and arranged at an angle relative to the top plate, the angle being greater than zero, a cooking plate connected to the top edge, and a basket assembly arranged inside the drum under the cooking plate and removably connected to the top edge.

In some embodiments, at least one of the first curvilinear side plate and the second curvilinear side plate forms a bottom edge of the enclosure assembly, and in the fully closed position, the bottom edge is spaced apart from the cooking plate. In some embodiments, the hinge assembly further comprises at least one spring connected at a first end to the bracket and at a second end to the lever, the at least one spring imparting a biasing force on the lever with respect to the bracket in a first circumferential direction. In some embodiments, the hinge assembly further comprises a stopper pin operatively arranged to prevent the lever from displacing in the first circumferential direction, and maintain the enclosure assembly in a fully opened position. In some embodiments, the bracket further comprises a plurality of apertures, each aperture of the plurality of apertures being spaced apart in an axial direction, the spring is connected to one of the plurality of apertures via a pin, and the biasing force is adjustable by selectively engaging the pin with the plurality of apertures. In some embodiments, the basket assembly comprises at least one vertical edge and the cooking plate is engaged with the at least one vertical edge. In some embodiments, the pizza oven assembly further comprises a partition operatively arranged in the basket assembly to form a front section and a rear section of the basket assembly. In some embodiments, the cooking plate secures the partition in the basket assembly and covers the front section. In some embodiments, the cooking plate comprises two apertures operatively arranged to be used as handles for the pizza oven assembly.

According to aspects illustrated herein, there is provided a pizza oven assembly, comprising a drum including a lateral wall forming a top edge, an enclosure assembly, including a planar top plate, a first curvilinear side plate connected to the top plate, a second curvilinear side plate connected to the top plate opposite the first curvilinear side plate, and a planar rear plate connected and arranged at an angle relative to the top plate, the angle being greater than zero, a drum lid, a hinge assembly, including a bracket fixedly secured to the lateral wall, a lever rotatably connected to the bracket, the lever fixedly secured to the drum lid and the enclosure assembly, and at least one spring imparting a biasing force on the lever relative to the bracket in a first circumferential direction, the biasing force being adjustable via engagement of a tensioner pin with a plurality of apertures arranged on the bracket, a cooking plate connected to the top edge, and a basket assembly arranged inside the drum and removably connected to the top edge.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
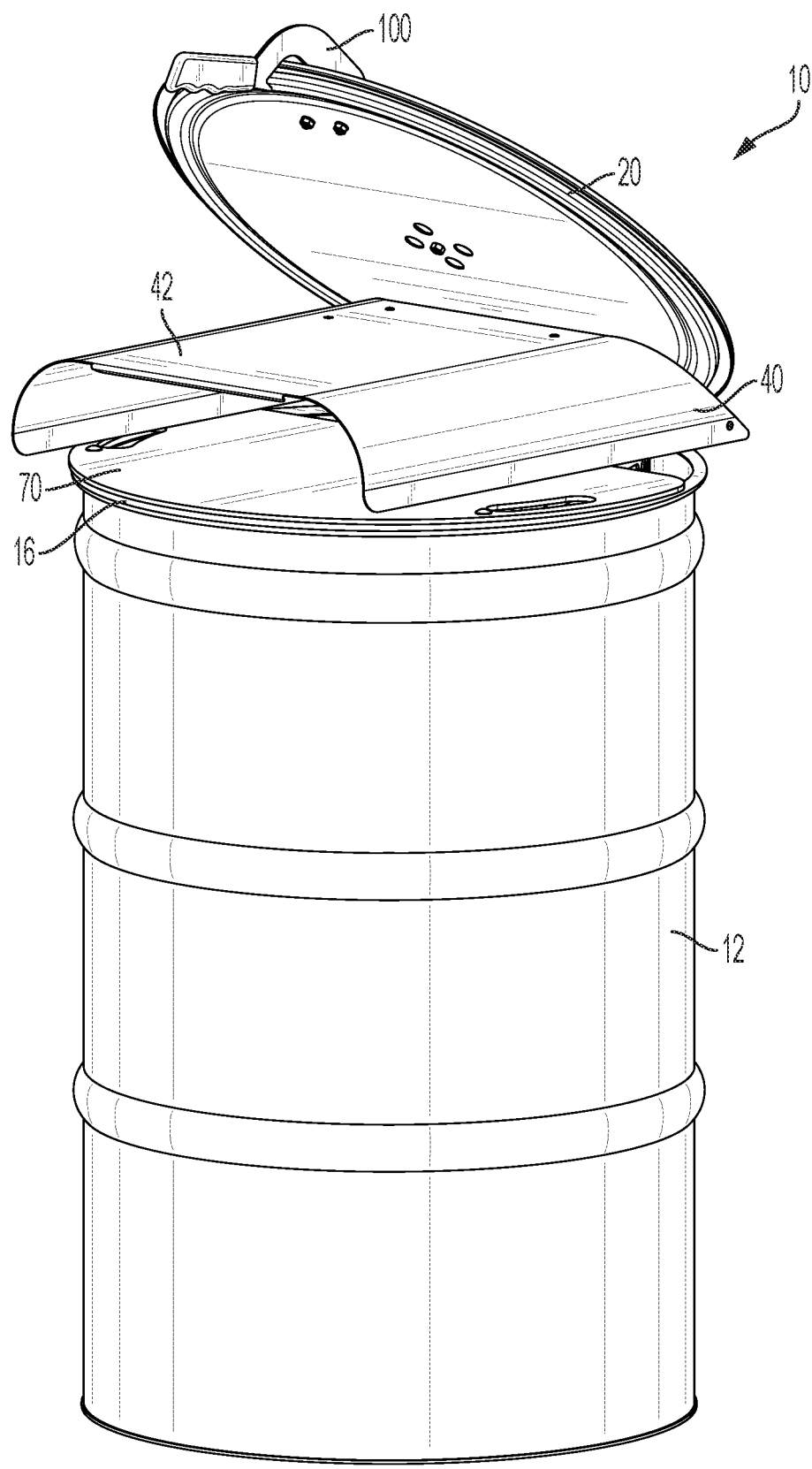
FIG. 1 is a front perspective view of a pizza oven assembly, in a closed state, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

It should be appreciated that the term smoker as used herein can also mean grill, and that the assemblies of the present disclosure can be applied to both smokers and grills. It should also be appreciated that the term lid is synonymous with the terms cover and hood, and that these terms as used herein are intended to mean the same thing, namely, the top portion of the smoker or grill that is engaged with or hingedly connected to the base and operatively arranged to cover the food being cooked therein.

Figure 2:
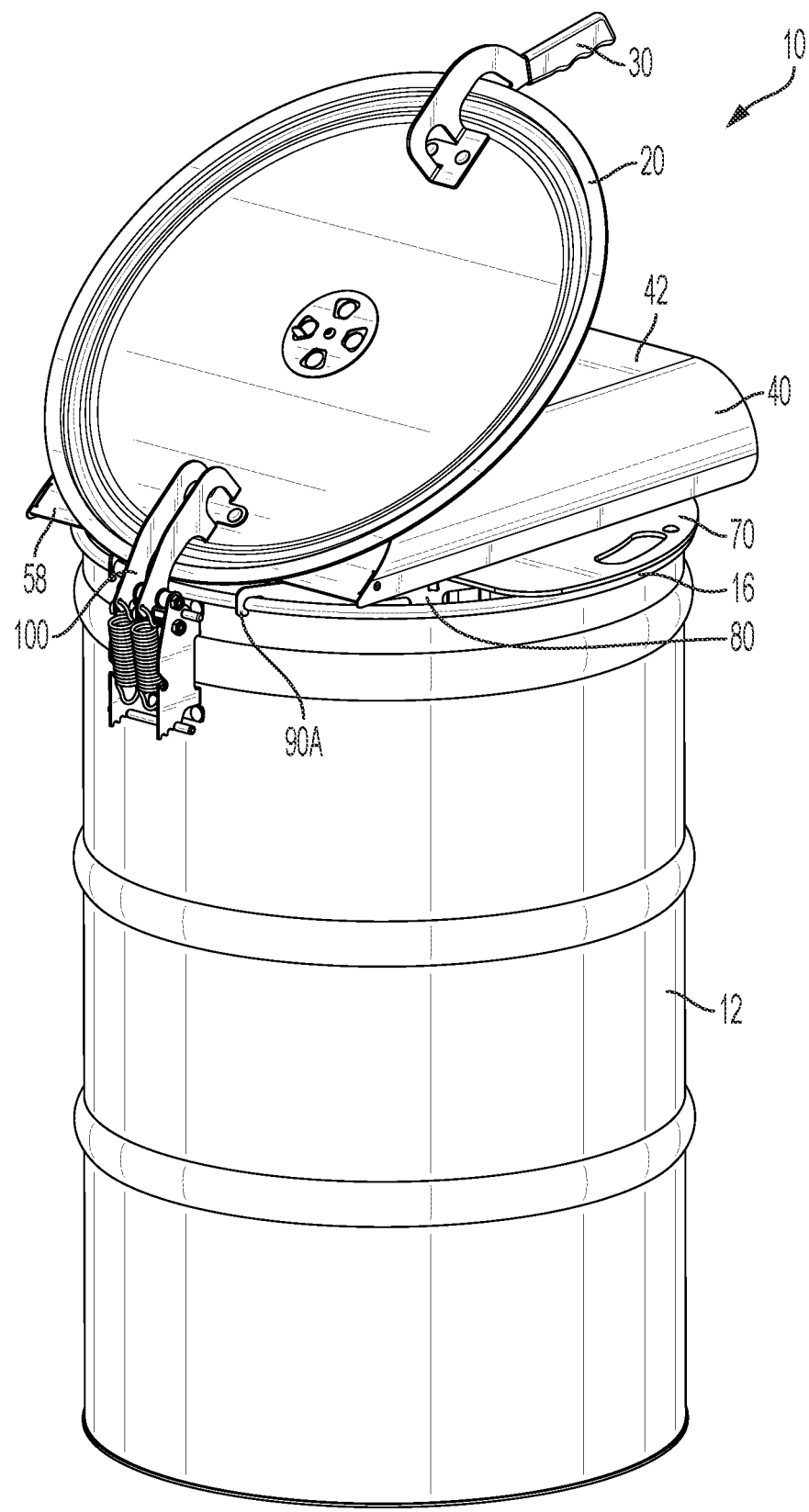
FIG. 2 is a rear perspective view of the pizza oven assembly shown in FIG. 1.
Figure 3:
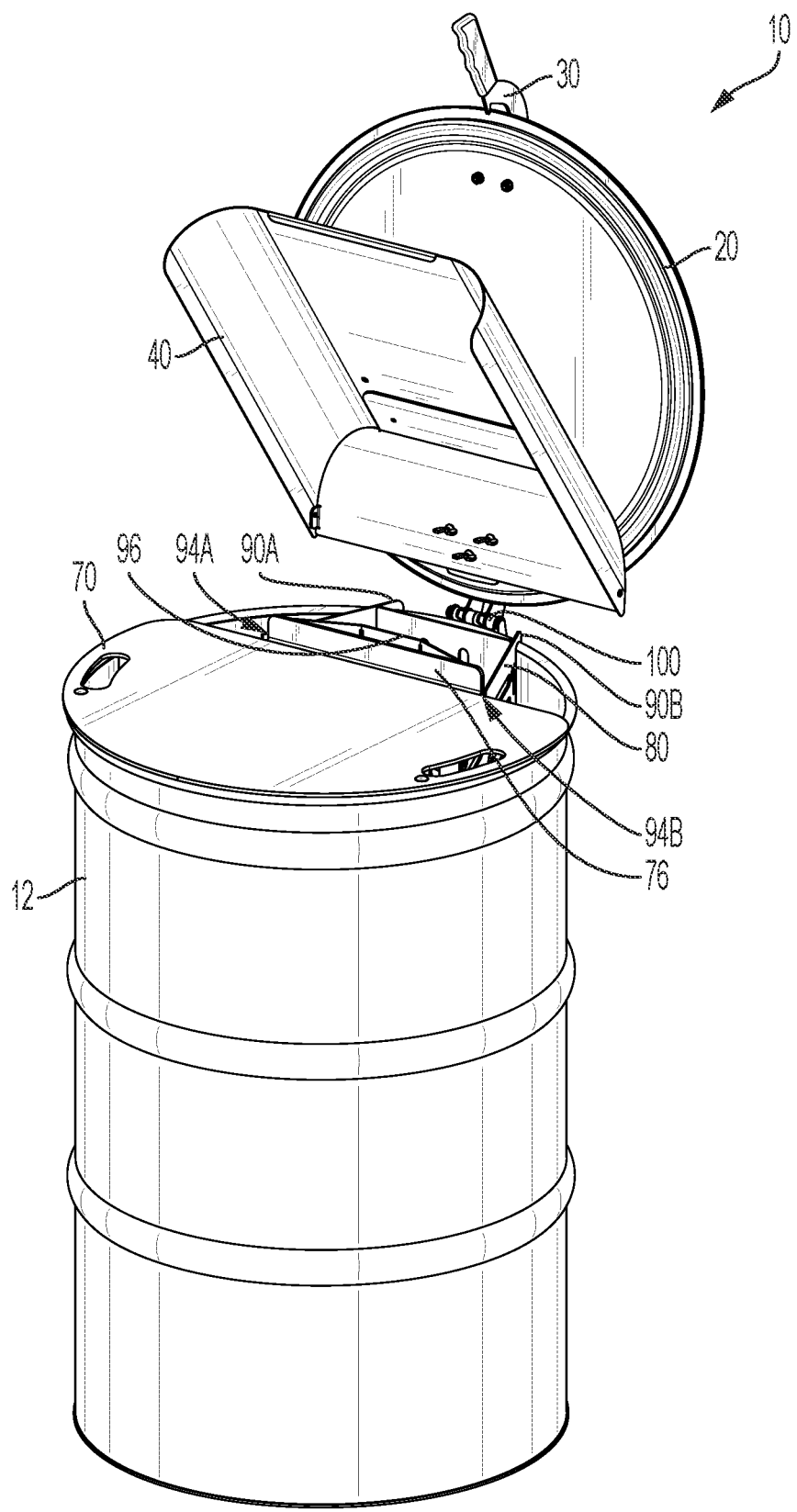
FIG. 3 is a front perspective view of the pizza oven assembly shown in FIG. 1, in an open state.
Figure 4:
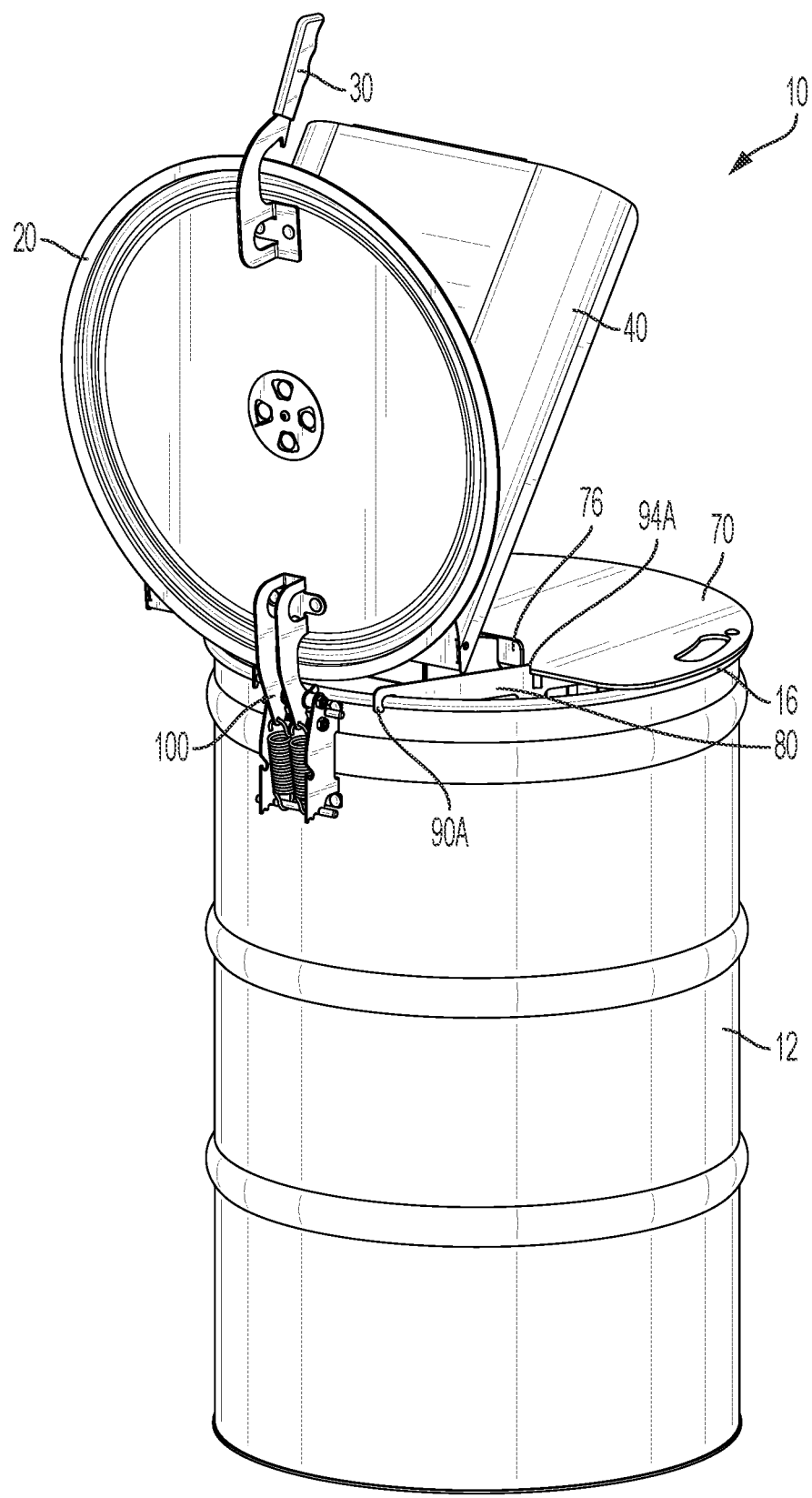
FIG. 4 is a rear perspective view of the pizza oven assembly shown in FIG. 3.
Figure 5:
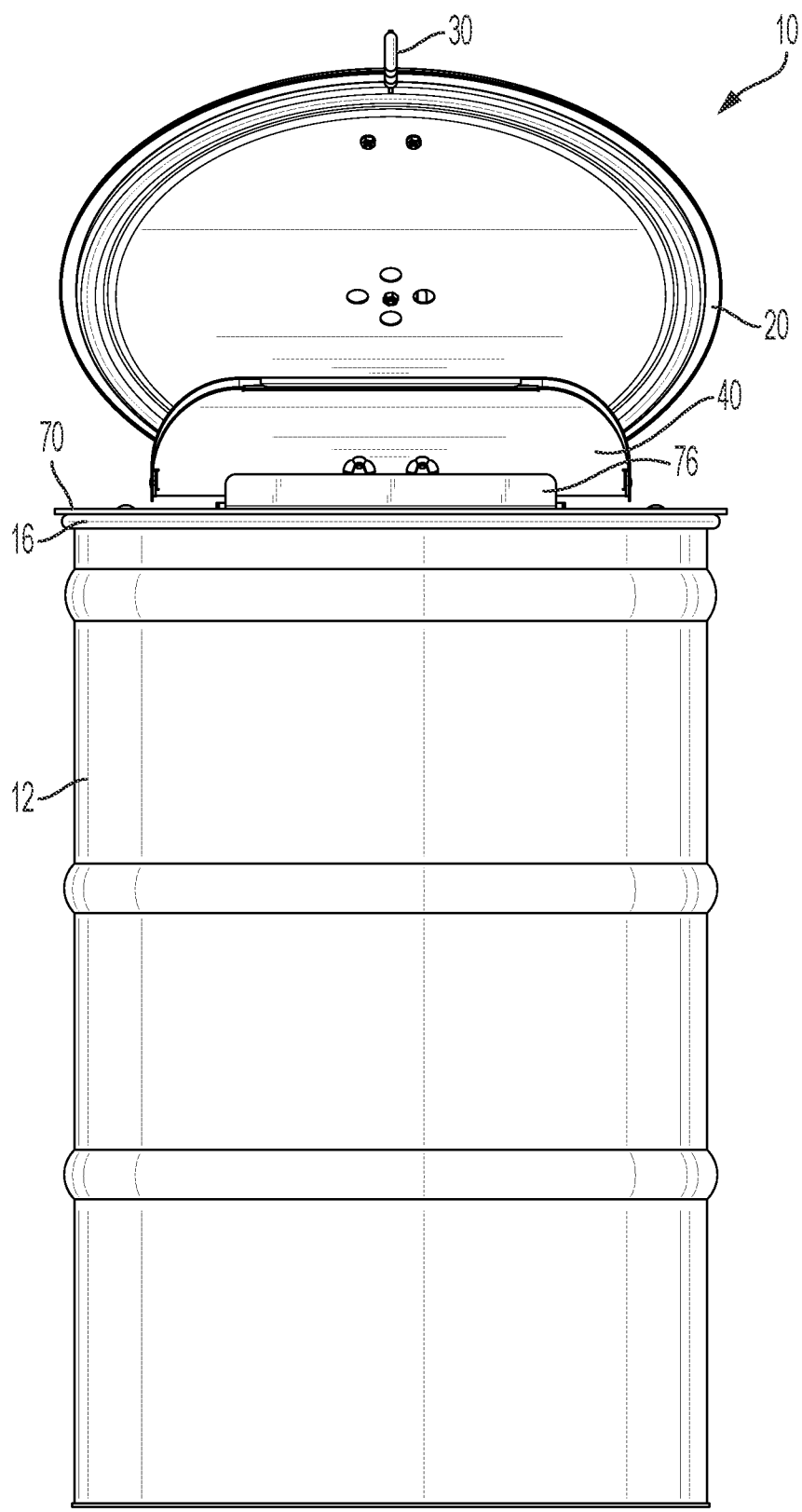
FIG. 5 is a front elevational view of the pizza oven assembly shown in FIG. 1.
Figure 6:
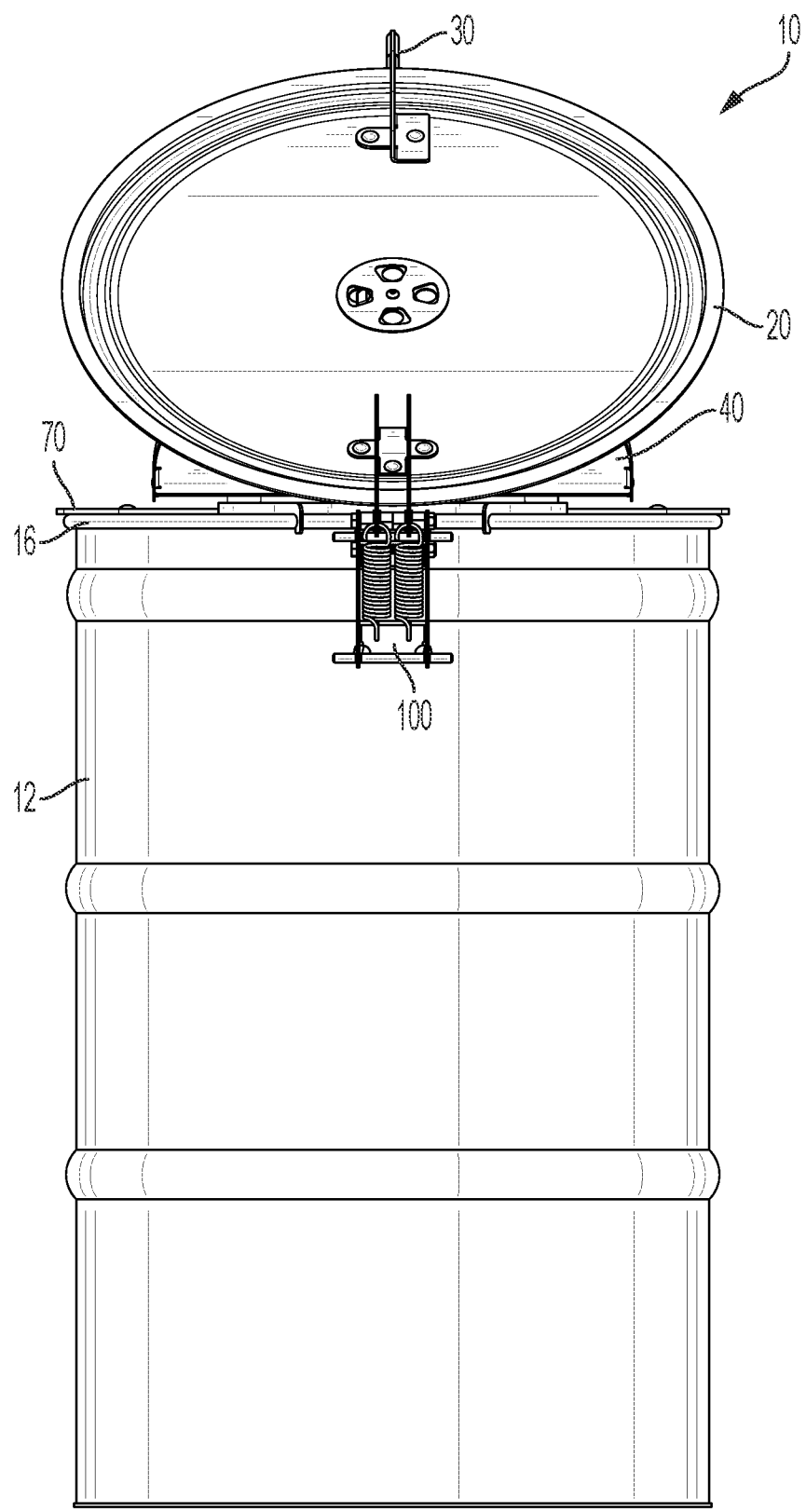
FIG. 6 is a rear elevational view of the pizza oven assembly shown in FIG. 1.
Figure 7:
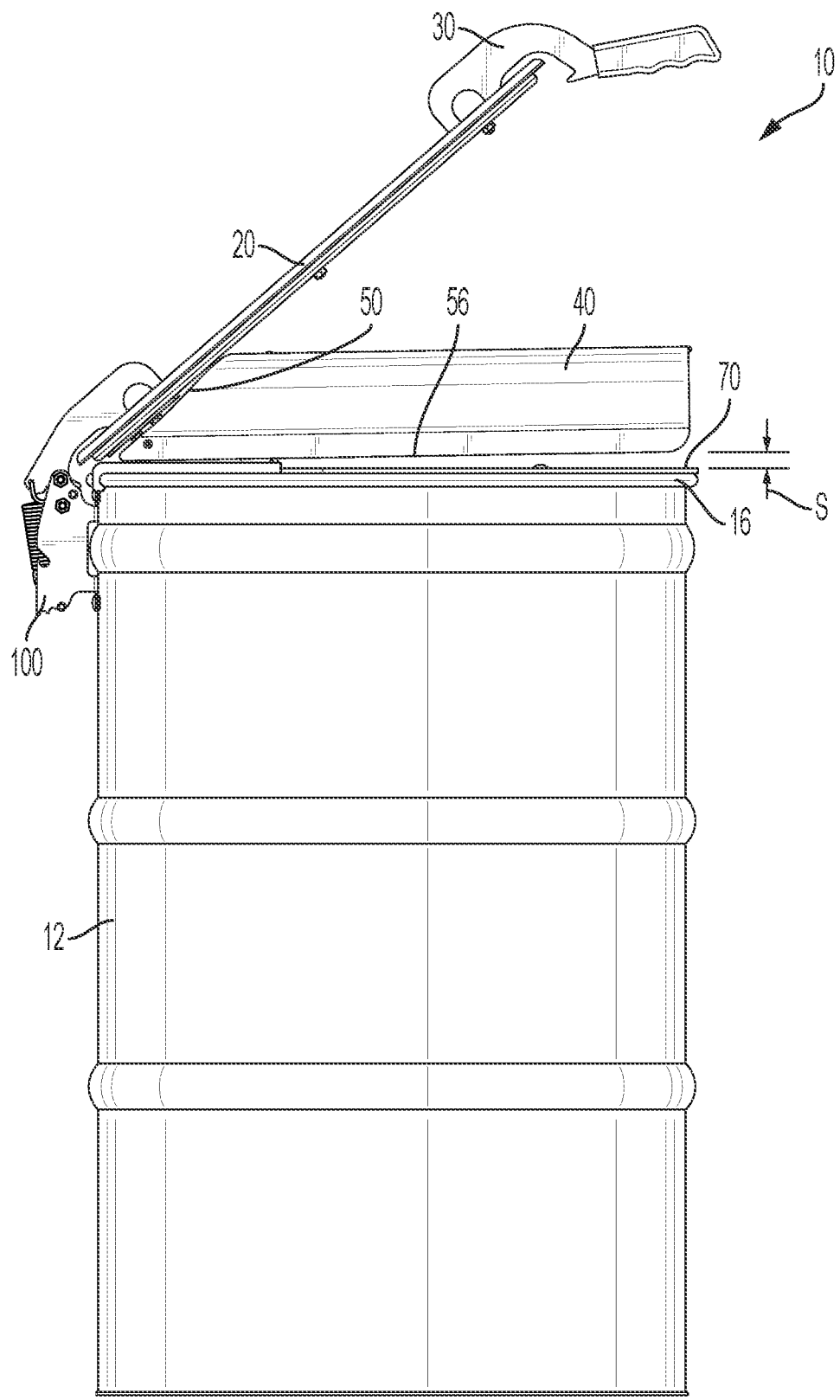
FIG. 7 is a left side elevational view of the pizza oven assembly shown in FIG. 1.
Figure 8:
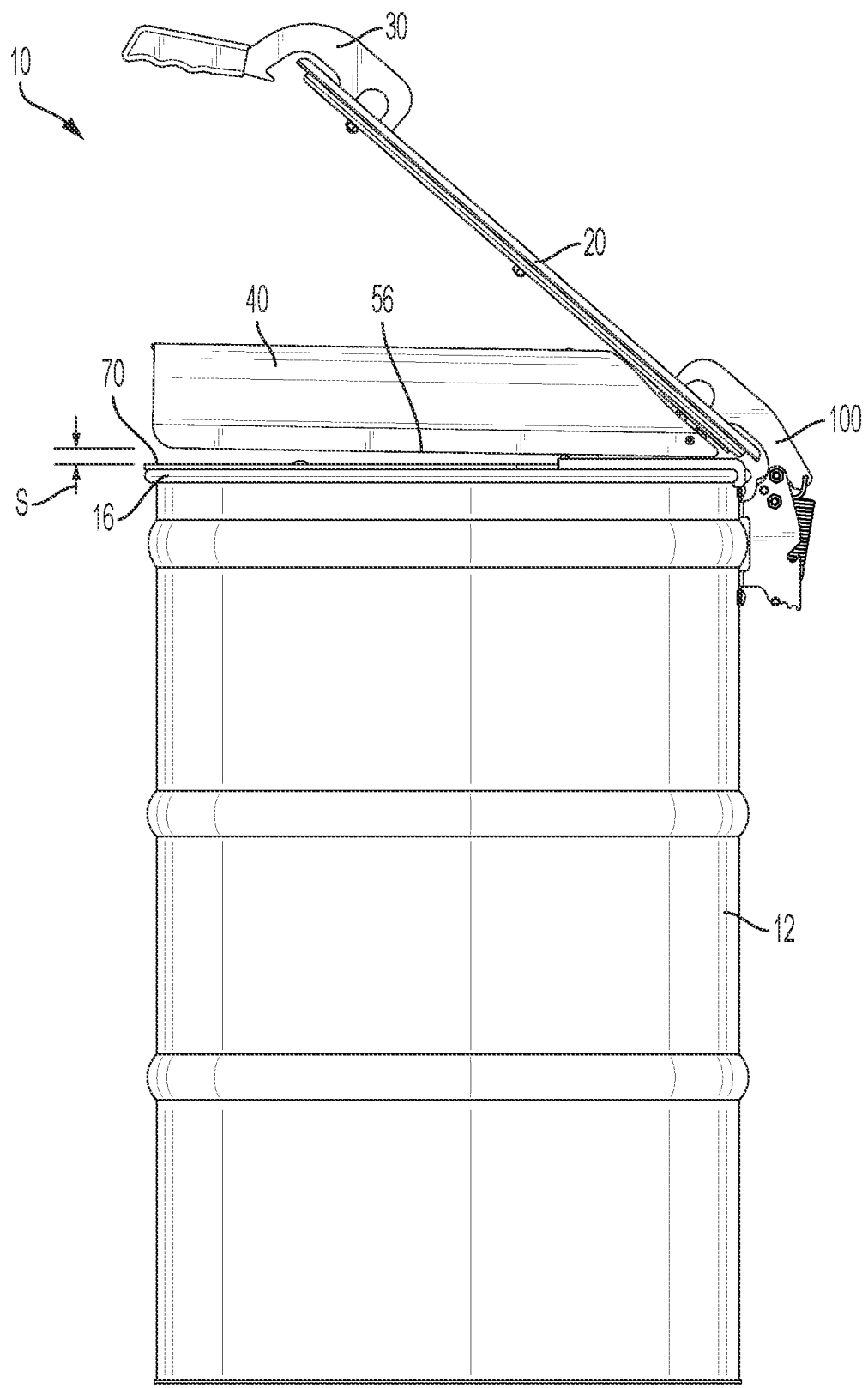
FIG. 8 is a right side elevational view of the pizza oven assembly shown in FIG. 1.
Figure 9:
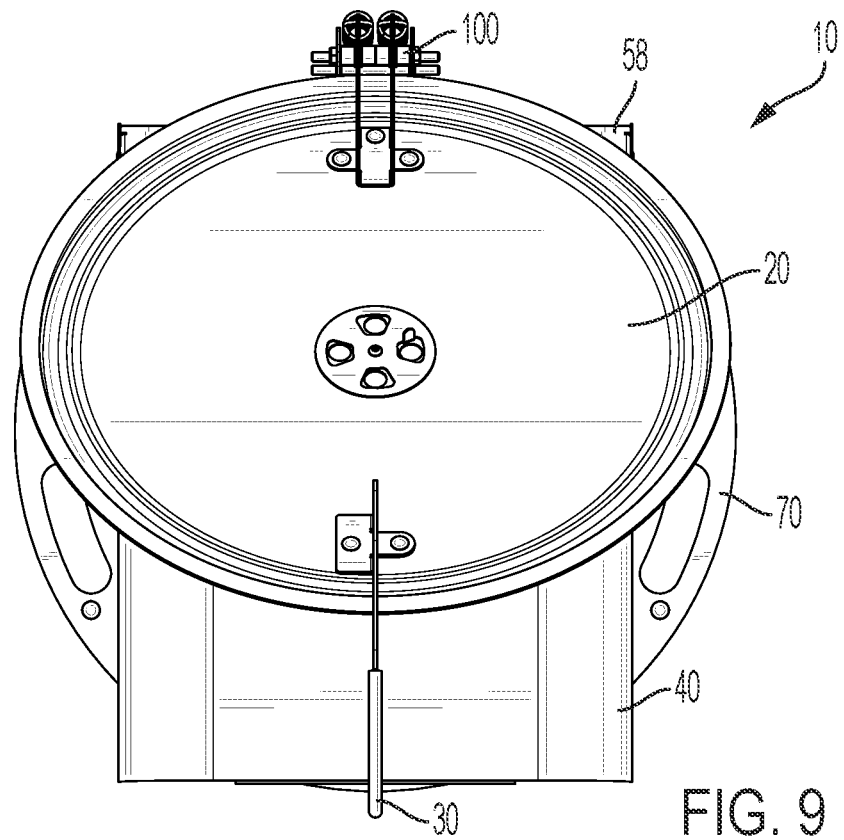
FIG. 9 is a top elevational view of the pizza oven assembly shown in FIG. 1.
Figure 10:
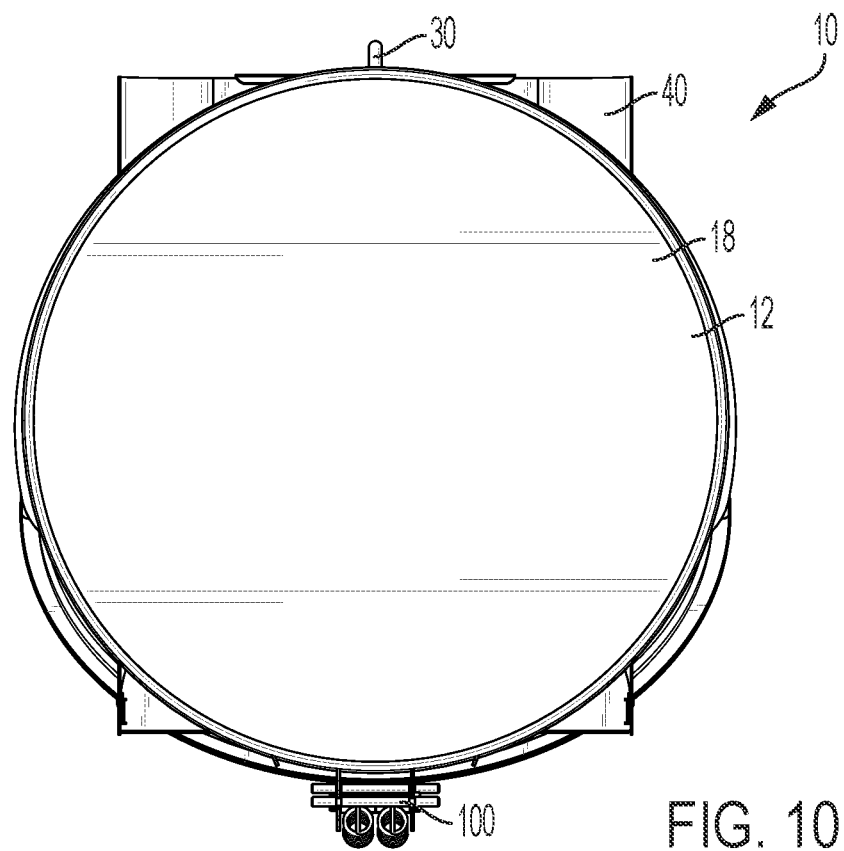
FIG. 10 is a bottom elevational view of the pizza oven assembly shown in FIG. 1.
Figure 11:
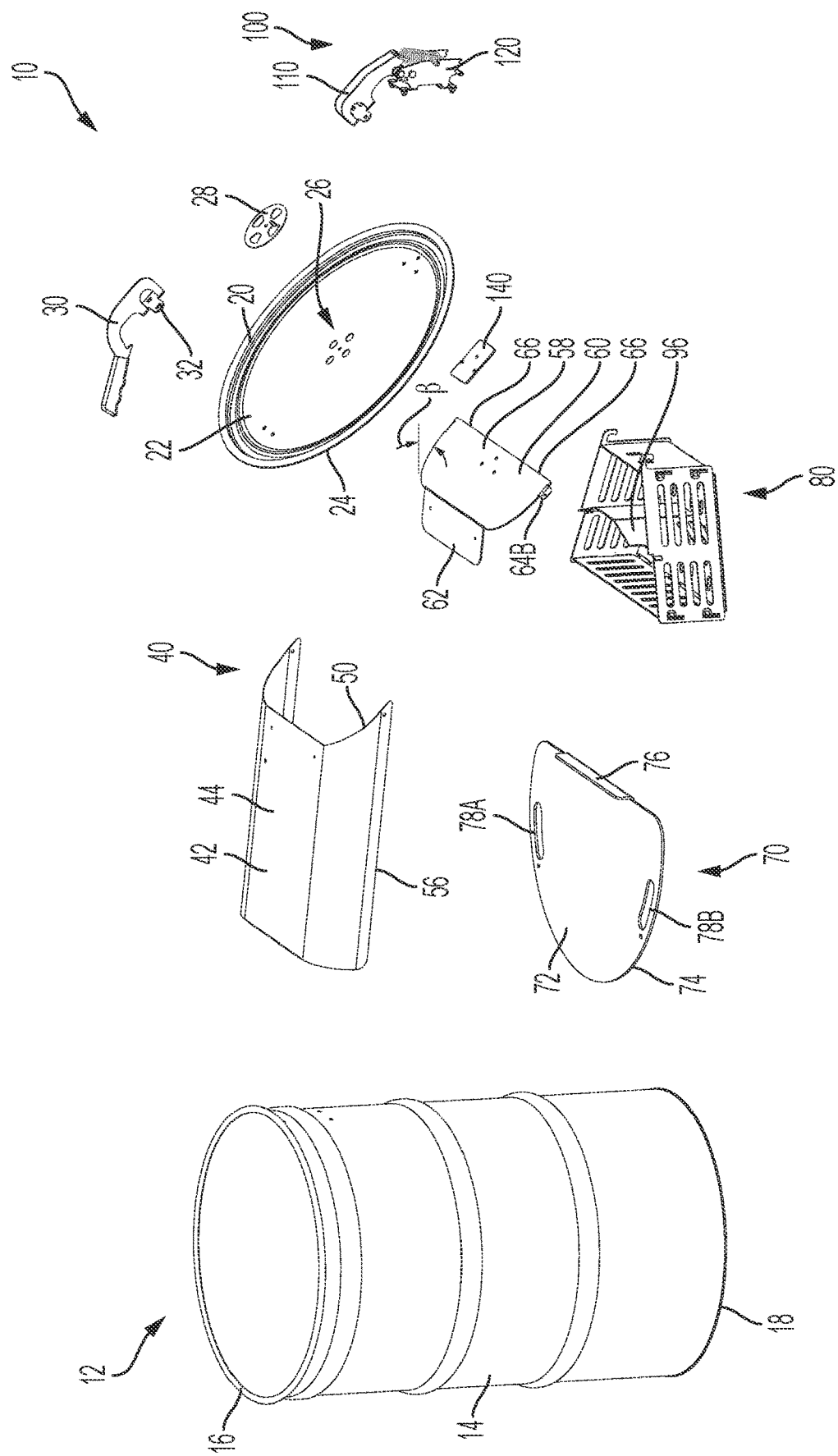
FIG. 11 is an exploded perspective view of the pizza oven assembly shown in FIG. 1.

Referring now to the figures, FIG. 1 is a front perspective view of pizza oven assembly 10, in a closed state, in accordance with some embodiments of the present disclosure. FIG. 2 is a rear perspective view of pizza oven assembly 10. FIG. 3 is a front perspective view of pizza oven assembly 10, in an open state. FIG. 4 is a rear perspective view of pizza oven assembly 10. FIG. 5 is a front elevational view of pizza oven assembly 10. FIG. 6 is a rear elevational view of pizza oven assembly 10. FIG. 7 is a left side elevational view of pizza oven assembly 10. FIG. 8 is a right side elevational view of pizza oven assembly 10. FIG. 9 is a top elevational view of pizza oven assembly 10. FIG. 10 is a bottom elevational view of pizza oven assembly 10. FIG. 11 is an exploded perspective view of pizza oven assembly 10. Pizza oven assembly 10 generally comprises enclosure assembly 40, cooking plate or surface 70, basket assembly 80, and hinge assembly 100 and is operatively arranged to be installed on drum 12. In some embodiments, pizza oven assembly 10 comprises drum 12, lid 20, enclosure assembly 40, cooking plate 70, basket assembly 80, and hinge assembly 100. The following description should be read in view of FIGS. 1-11.

Drum 12 generally comprises lateral wall 14, top 16, and bottom 18. Top 16 is open such that elements may be inserted therein and bottom 18 is closed. It should be appreciated that, even though the drawings show a drum, pizza oven assembly 10 can be embodied using any type of container, such as a grill bottom or base.

Lid 20 is hingedly connected to drum 12 via hinge assembly 100. It should be appreciated that when drum 12 is used as a smoker, lid 20 is operatively arranged to engage drum 12, specifically, top 16 to fully enclose drum 12. Lid 20 comprises top surface 22, bottom surface 24, and vent 26. Bottom surface 24 is operatively arranged to face, be directed toward, or engage top 16. Vent 26 generally comprises at least one aperture in lid 20.

Vent cover 28 is rotatably connected to lid 20 proximate vent 26. Vent cover 28 is operatively arranged to be rotated relative to lid 20, specifically vent 26, to cover and uncover the apertures of vent 26, thus allowing air to pass therethrough. Vent cover 28 can be connected to lid 20, specifically top surface 24, via any means suitable for rotatable connection, for example, a bolt, screw, nail, rivet, pin, etc.

Handle 30 is fixedly secured to lid 20 and operatively arranged to allow a user to more easily rotated or pivot lid 20 with respect to drum 12. In some embodiments, handle 30 comprises at least one flange 32 that is fixedly secured to top surface 24. Handle 30 can be connected to lid 20 via any means suitable for fixed connection, for example, bolts, screws, nails, rivets, pins, welding, soldering, adhesives, etc. In some embodiments, and as best shown in FIGS. 7-8, handle 30 is arranged at an angle relative to lid 20, specifically bottom surface 24. For example, handle 30 is arranged at an angle of 150° relative to lid 20.

Cooking plate or plate 70 is operatively arranged to engage top 16 of drum 12. Plate 70 generally comprises top surface 72 and bottom surface 74. Bottom surface 74 engages and/or abuts against top 16. Top surface 72 provides a cooking surface for food, for example, pizzas. In some embodiments, and as shown, plate 70 further comprises flange 76 which extends from top surface 72. Flange 76 provides a limit or stopper for food arranged on top surface 72. Flange 76 may also provide an alignment indicator. As best shown in FIGS. 3-4, flange 76, or plate 70, is operatively arranged to engage and/or abut against vertical edges 94A-B. In some embodiments, flange 76 is arranged perpendicular to top surface 72. In some embodiments, flange 76 is arranged non-perpendicular to flange 76. In some embodiments, and as shown, cooking plate 70 is fixedly secured to drum 12, for example, via bolts that extend through plate 70 and engage drum 12 (see FIG. 3). However, it should be appreciated that cooking plate 70 can be connected to drum 12 via any suitable means, for example, screws, nails, dowels, pins, welding, soldering, adhesives, etc. In some embodiments, plate 70 further comprises apertures 78A-B. Apertures 78A-B provide handles for pizza oven assembly 10.

Figure 12:
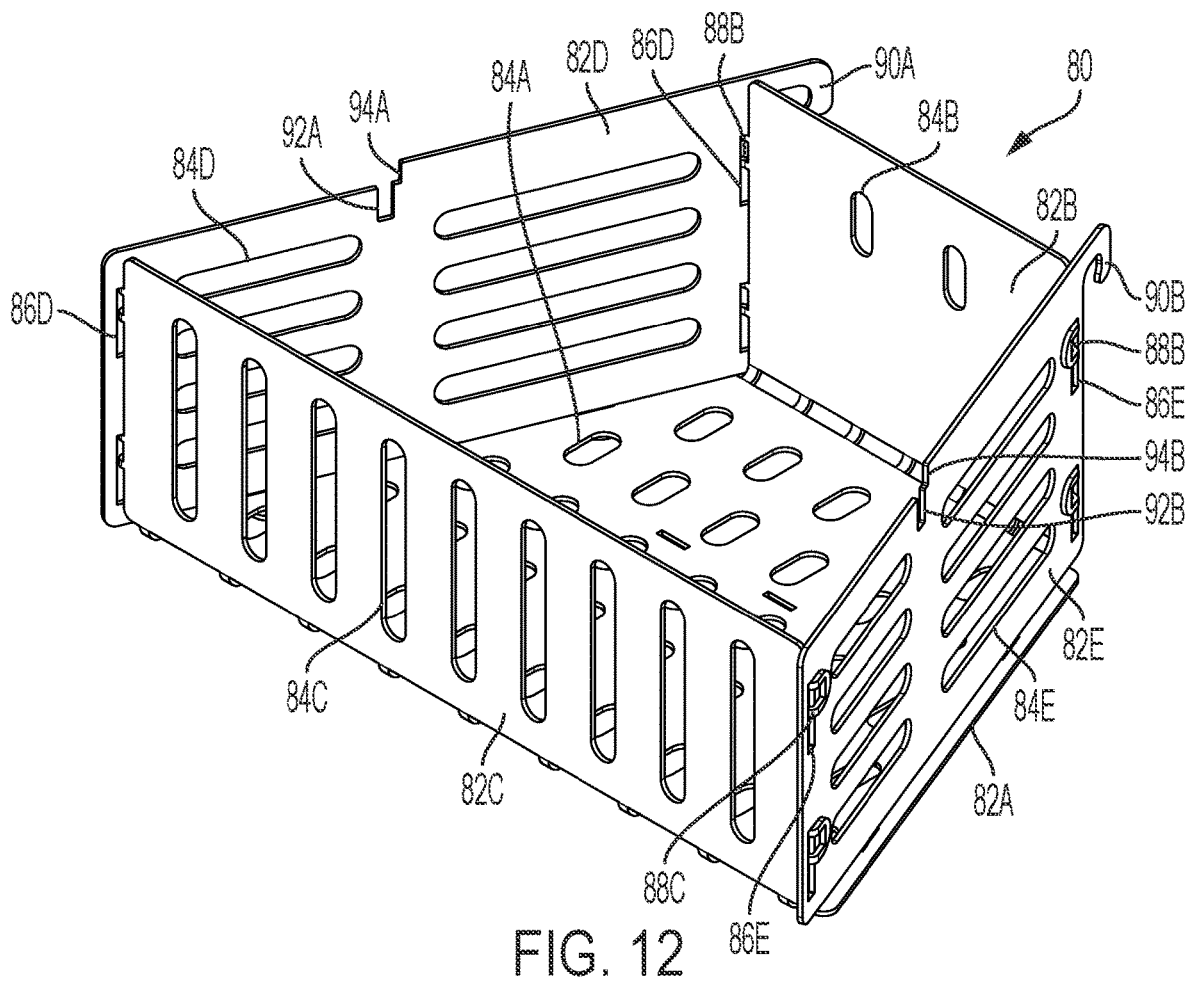
FIG. 12 is a perspective view of a basket assembly, in an assembled state.
Figure 13:
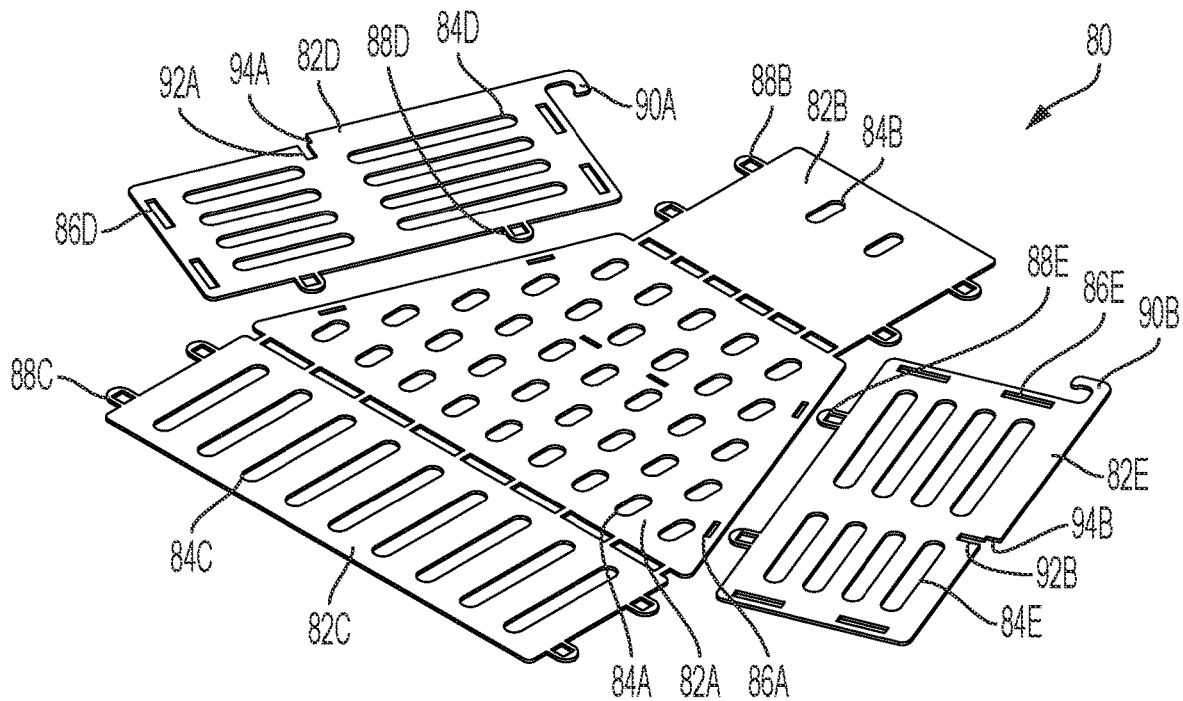
FIG. 13 is a perspective view of the basket assembly shown in FIG. 12, in a disassembled state.

FIG. 12 is a perspective view of basket assembly 80, in an assembled state. FIG. 13 is a perspective view of basket assembly 80, in a disassembled state. Basket assembly 80 generally comprises a plurality of sections operatively arranged to hold a heat energy producing source, for example, charcoal, woodchips, wood, wood pellets, etc. In some embodiments, basket assembly 80 is operatively arranged to hold a gas or an electric heat source. Basket assembly 80 comprises a plurality of sections, for example, sections 82A-E. In some embodiments, basket assembly 80 further comprises partition 96. The following description should be read in view of FIGS. 1-13.

Section 82A forms the bottom wall of basket assembly 80 and comprises plurality of apertures 84A and plurality of slots 86A. Apertures 84A are operatively arranged to allow air (i.e., oxygen) to flow to the burning energy source, for example, charcoal, arranged in basket assembly 80 to produce greater heat. Slots 86A are operatively arranged to engage tabs of sidewall sections to form the assembled basket assembly 80.

Section 82B forms a side or the rear wall of basket assembly 80 and comprises plurality of apertures 84B and plurality of tabs 88B. Apertures 84B are operatively arranged to allow air (i.e., oxygen) to flow to the burning energy source, for example, charcoal, arranged in basket assembly 80 to produce greater heat. Tabs 88B are operatively arranged to engage slots of sidewall sections to form the assembled basket assembly 80.

Section 82C forms a side or the front wall of basket assembly 80 and comprises plurality of apertures 84C and plurality of tabs 88C. Apertures 84C are operatively arranged to allow air (i.e., oxygen) to flow to the burning energy source, for example, charcoal, arranged in basket assembly 80 to produce greater heat. Tabs 88C are operatively arranged to engage slots of sidewall sections to form the assembled basket assembly 80.

Section 82D forms a side wall of basket assembly 80 and comprises plurality of apertures 84D, plurality of slots 86D, and plurality of tabs 88B. Apertures 84D are operatively arranged to allow air (i.e., oxygen) to flow to the burning energy source, for example, charcoal, arranged in basket assembly 80 to produce greater heat. Slots 86D are operatively arranged to engage tabs of sidewall sections to form the assembled basket assembly 80. Tabs 88D are operatively arranged to engage slots of sidewall sections to form the assembled basket assembly 80. In some embodiments, section 82D further comprises hook 90A operatively arranged to engage top 16 to connect basket assembly 80 to drum 12. In some embodiments, section 82D further comprises groove 92A operatively arranged to engage partition 96 (see FIG. 11). Partition 96 is generally a vertical partition that divides basket assembly 80 into two separate baskets. In some embodiments, section 82D further comprises vertical edge 94A operatively arranged to engage and/or abut against the rear edge of cooking plate 70 and/or flange 76.

Section 82E forms a side wall of basket assembly 80 and comprises plurality of apertures 84E, plurality of slots 86E, and plurality of tabs 88E. Apertures 84E are operatively arranged to allow air (i.e., oxygen) to flow to the burning energy source, for example, charcoal, arranged in basket assembly 80 to produce greater heat. Slots 86E are operatively arranged to engage tabs of sidewall sections to form the assembled basket assembly 80. Tabs 88E are operatively arranged to engage slots of sidewall sections to form the assembled basket assembly 80. In some embodiments, section 82E further comprises hook 90B operatively arranged to engage top 16 to connect basket assembly 80 to drum 12. In some embodiments, section 82E further comprises groove 92B operatively arranged to engage partition 96 (see FIG. 11). Partition 96 is generally a vertical partition that divides basket assembly 80 into two separate baskets. In some embodiments, section 82E further comprises vertical edge 94B operatively arranged to engage and/or abut against the rear edge of cooking plate 70 and/or flange 76.

To assemble basket assembly 80 from the disassembled state shown in FIG. 13 to the assembled state shown in FIG. 12, section 82B is displaced circumferentially with respect to section 82A until section 82B and section 82A are generally perpendicular (i.e., section 82B is bent upward). Likewise, section 82C is displaced circumferentially with respect to section 82A until section 82C and section 82A are generally perpendicular (i.e., section 82C is bent upward). At this point, section 82C and section 82B should be generally parallel to each other.

Section 82D is then assembled by engaging tabs 88D with slots 86A of section 82A, and slots 86D with tabs 88B of section 82B and tabs 88C of section 82C. Tabs 88B of section 82B and tabs 88C of section 82C are then plastically deformed or bent around section 82D, and tabs 88D of section 82D are plastically deformed or bent around section 82A, thereby securing section 82D to sections 82A, 82B, and 82C.

Section 82E is then assembled by engaging tabs 88E with slots 86A of section 82A, and slots 86E with tabs 88B of section 82B and tabs 88C of section 82C. Tabs 88B of section 82B and tabs 88C of section 82C are then plastically deformed or bent around section 82E, and tabs 88E of section 82E are plastically deformed or bent around section 82A, thereby securing section 82E to sections 82A, 82B, and 82C.

If desired, partition 96 can then be arranged in basket assembly 80. Partition 96 may comprise two lateral tabs that engage grooves 92A-B and two bottom tabs that engage the center slots 86A in section 82A to connect partition 96 thereto. Such engagement maintains partition 96 in the generally vertical position shown in FIG. 11.

Once assembled, basket assembly 80 is then connected to drum 12. Specifically, hooks 90A-B are engaged with top 16 and basket assembly 80, namely sections 82A-E, are arranged predominately within drum 12, that is, below top 16. If desired, partition 96 is arranged in drum 12. Then, cooking plate 70 is connected to drum 12. Cooking plate 70 is arranged on top 16 with its back edge or flange 76 engaged with or abutting against vertical edges 94A-B. The connection of cooking plate 70 secures partition 96 within basket assembly 80, as it maintains the lateral tabs of partition 96 within grooves 92A-B. As previously described, cooking plate 70 can then be secured to drum 12, for example, via bolts.

Figure 14:
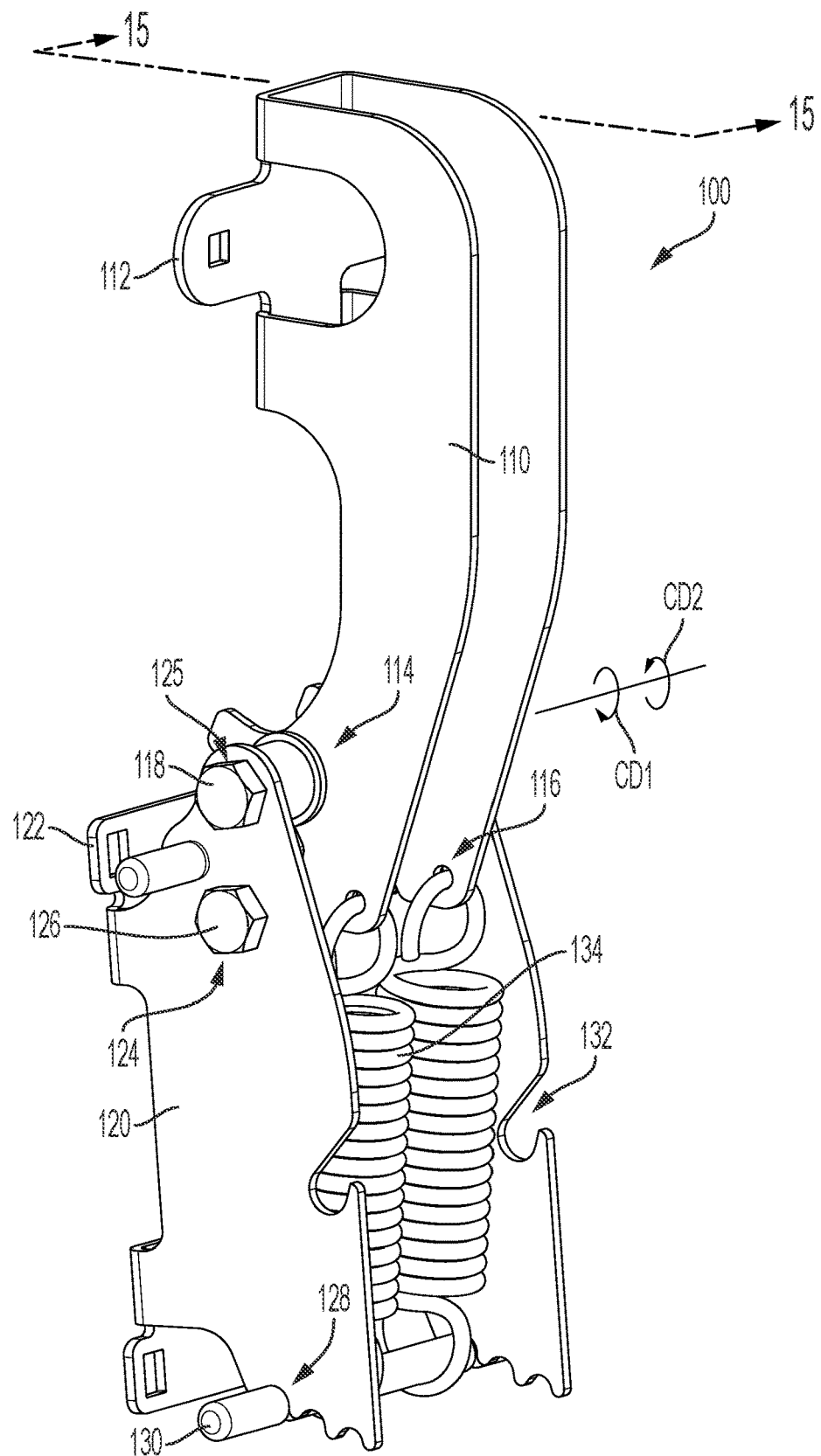
FIG. 14 is a perspective view of a hinge assembly.
Figure 15:
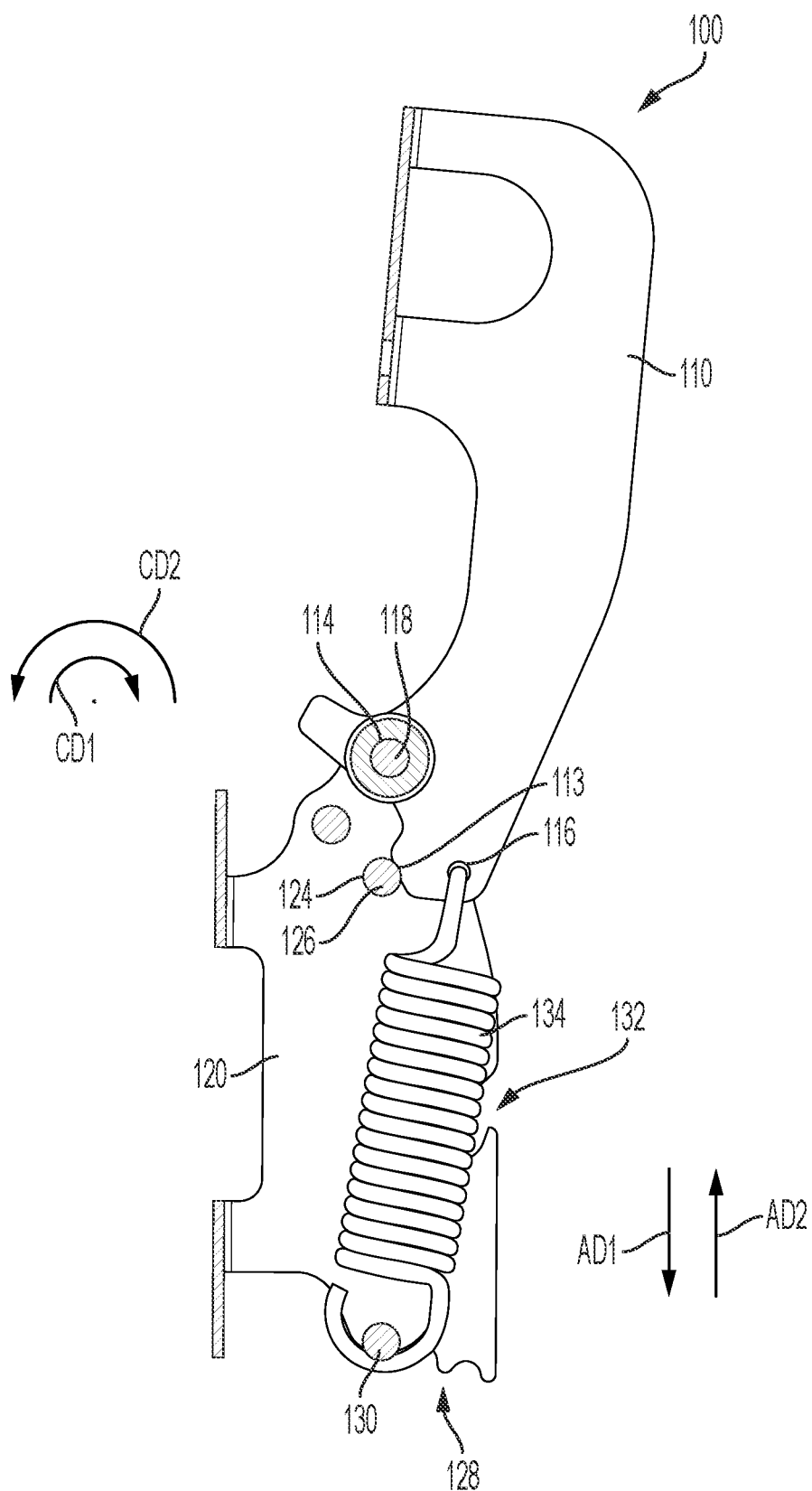
FIG. 15 is a cross-sectional view of the hinge assembly taken generally along line 15-15 in FIG. 14.

FIG. 14 is a perspective view of hinge assembly 100. FIG. 15 is a cross-sectional view of hinge assembly 100 taken generally along line 15-15 in FIG. 14. Hinge assembly 100 generally comprises lever 110, bracket 120 and at least one spring, for example, springs 134. Hinge assembly 100 is operatively arranged to connect enclosure assembly 40 to lid 20, and to hingedly connect enclosure assembly 40 and lid 20 to drum 12. The following description should be read in view of FIGS. 1-15.

Lever 110 is generally an arm operatively arranged to be fixedly secured to lid 20 and enclosure assembly 40. Lever 110 comprises one or more flanges 112, one or more through-bores, for example through-bores 114 and 116, and edge 113. Flanges 112 are arranged to be fixedly secured to both lid 20 and enclosure assembly 40. For example, bolts extend through flanges 112, lid 20, and plate 140 and nuts secure the three components together. In some embodiments, such bolts further extend through enclosure assembly 40, specifically section 58, and another set of nuts secure the four components together. In such embodiments, enclosure assembly 40 (i.e., edge 50 and plate 60) is spaced apart from lid 20 due to the arrangement of the intermediate bolts (see FIGS. 7-8). In some embodiments, enclosure assembly 40 abuts against lid 20. It should be appreciated that lever 110 may be secured to lid 20 and enclosure assembly 40 via any suitable means, for example, bolts, screws, rivets, nails, pins, dowels, welding, soldering, adhesives, etc.

Bracket 120 is operatively arranged to be fixedly secured to drum 12. Bracket 120 comprises one or more flanges 122, one or more through-bores, for example through-bores 124 and 125, and a plurality of apertures 128. Flanges 122 are arranged to be fixedly secured to drum 12. For example, bolts extend through flanges 122 and lateral wall 14 and nuts secure bracket 120 and drum 12 together. It should be appreciated that bracket 120 may be secured to drum 12 via any suitable means, for example, bolts, screws, rivets, nails, pins, dowels, welding, soldering, adhesives, etc. In some embodiments, bracket 120 further comprises one or more grooves 132, which are arranged as bottle openers (i.e., bottle opening grooves 132).

Lever 110 is rotatably connected to bracket 120 via bolt or pin or rod 118. Bolt 118 extends through through-bores 125 and 114. In some embodiments, bushings and/or washers are arranged on bolt 118 between bracket 120 and lever 110.

Springs 134 further connect lever 110 to bracket 120. Specifically, at first ends, springs 134 engage through-bore 116, and at second ends, springs 134 engage tensioner pin 130. Tensioner pin 130 is engaged with one of plurality of apertures 128 thereby connecting the second ends of springs 134 to bracket 120. Springs 134 provide a rotational bias to lever 110, and thus to lid 20 and enclosure assembly 40, in circumferential direction CD1, or toward the open position. Such rotational bias aids in the opening of lid 20 and enclosure assembly 40. The rotational biasing force of springs 134 can be adjusted. For example, as best shown in FIG. 15, tensioner pin 130 is engaged with the first or leftmost aperture 128, which provides the least rotational bias on lever 110. By moving tensioner pin 130 to the second or middle aperture 128, tensioner pin 130 is displaced in axial direction AD1 and thus increases the rotational bias on lever 110. Similarly, moving tensioner pin 130 to the third or rightmost aperture 128, tensioner pin 130 is again displaced in axial direction AD1 and the rotational bias on lever 110 is increased. To summarize, adjusting tensioner pin 130 in axial direction AD1 increases rotational bias on lever 110, while adjusting tensioner pin 130 in axial direction AD2 decreases rotational bias on lever 110.

In some embodiments, hinge assembly 100 further comprises stopper pin 126. Stopper pin 126 may be, for example, a bolt that extends through through-bore 124 and engages edge 113 when lever 110, and thus lid 20 and enclosure assembly 40, is in the fully open position, as best shown in FIG. 15. As lid 20 and enclosure assembly 40 are opened, lever 110 rotates in circumferential direction CD1 until edge 113 engages stopper pin 126, which prevents any further rotation. The engagement of edge 113 with stopper pin 126, as well as the rotational bias via springs 134, maintain lid 20 and enclosure assembly 40 in the fully open position.

Figure 16:
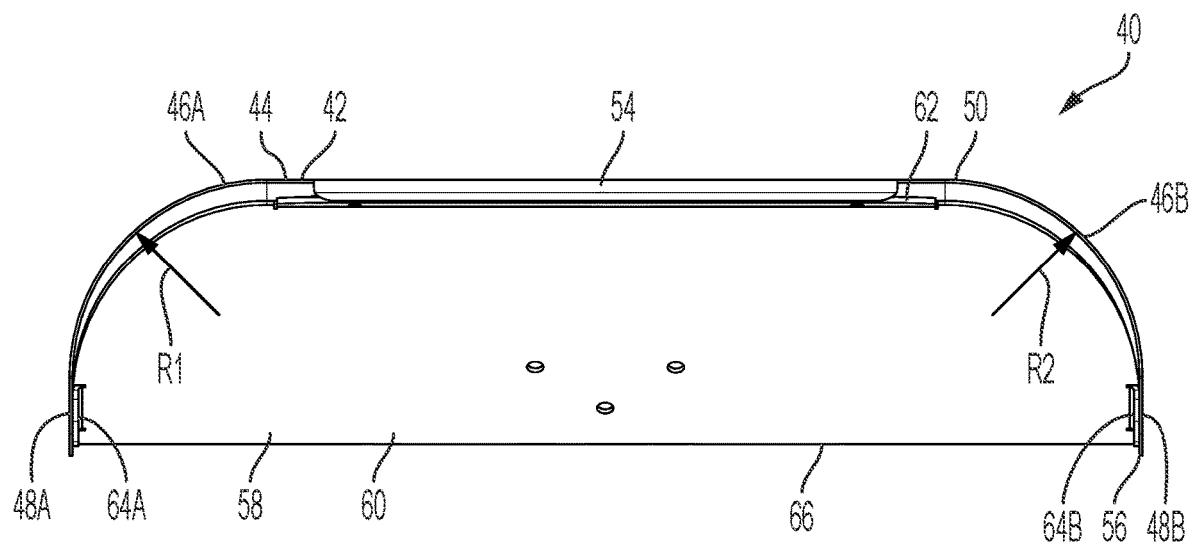
FIG. 16 is a front elevational view of an enclosure assembly.
Figure 17:
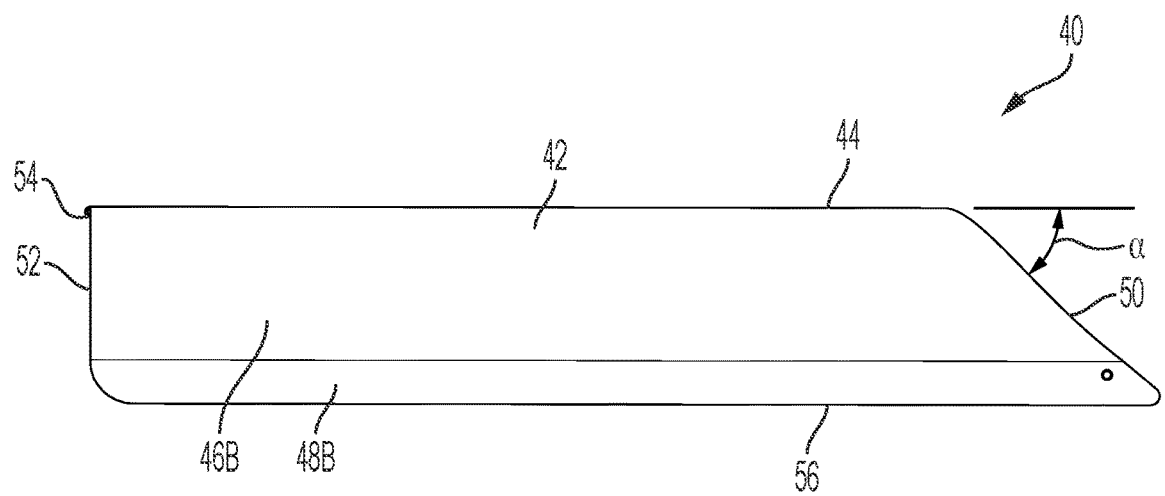
FIG. 17 is a side elevational view of the enclosure assembly shown in FIG. 16.

FIG. 16 is a front elevational view of enclosure assembly 40. FIG. 17 is a side elevational view of enclosure assembly 40. Enclosure assembly 40 generally comprises section 42 and section 58. The following description should be read in view of FIGS. 1-17.

Section 42 comprises plates 44, 46A-B, and 48A-B, rear edge 50, and front edge 52. Plate 44 is generally planar and forms the top of enclosure assembly. Plate 46A is curvilinear and is connected to a first side of plate 44. In some embodiments, plate 46A comprises radius R1. Plate 48A is generally planar and is connected to plate 46A. In some embodiments, plate 48A and plate 44 are perpendicular to each other. In some embodiments, plate 48A and plate 44 are non-perpendicular to each other.

Plate 46B is curvilinear and is connected to a second side of plate 44, opposite plate 46A. In some embodiments, plate 46B comprises radius R2. In some embodiments, radius R2 is equal to radius R1. In some embodiments, radius R2 is nonequal to radius R1. In some embodiments, plate 48A is generally planar and is connected to plate 46A. In some embodiments, plate 48A and plate 44 are perpendicular to each other. In some embodiments, plate 48A and plate 44 are non-perpendicular to each other.

Plates 48A-B form bottom edge 56. Plates 44, 46A-B, and 48A-B form rear edge 50 and front edge 52. In some embodiments, front edge 52 comprises lip 54. In some embodiments, rear edge 50 is arranged at angle α relative to plate 44. For example, rear edge 50 is arranged at 45° relative to plate 44.

Section 58 comprises plate 60 and plate 62. Plate 62 is generally planar and is operatively arranged to be connected to the plate 44 for example via bolts. Plate 60 is generally planar and is operatively arranged to be connected to plates 48A-B. Plate 60 comprises bottom edge 66. In some embodiments, plate 60 comprises flanges 64A-B operatively arranged to be connected to plates 48A-B, respectively, for example, via bolts. It should be appreciated that section 58 may be connected to section 42 via any suitable means, for example bolts, screws, nails, rivets, pins, dowels, welding, soldering, adhesives, etc. It should also be appreciated that in some embodiments sections 42 and 58 are integrally formed. In some embodiments, plate 62 is arranged at angle β relative to plate 60 (see FIG. 11). In some embodiments, when assembled, bottom edge 66 is unaligned with bottom edge 56 (see FIG. 16). In some embodiments, when assembled, bottom edge 66 is aligned with bottom edge 56.

As previously described, enclosure assembly 40, specifically section 58, is operatively arranged to be fixedly secured to lid 20 and lever 110 of hinge assembly 100. In the fully closed position, bottom edge 56 is spaced apart from cooking plate 70 by space S. The arrangement of space S in the fully closed position is advantageous in that it allows the temperature within enclosure assembly 40 to be more easily controlled.

An example of using pizza oven assembly 10 is as follows. Enclosure assembly 40 is moved to the open position as shown in FIG. 3. Basket assembly 80 is filled with charcoal or wood and connected to top 16 of drum 12 via hooks 90A-B. Optionally, partition 96 is arranged in basket assembly 80, and charcoal or wood is arranged in the rear section of the partitioned basket assembly 80 (i.e., in the section closest to hinge assembly 100). Then, cooking plate 70 is connected to top 16 of drum 12, thereby securing basket assembly 80 (and partition 86) to drum 12. The charcoal or wood can be ignited either before connecting cooking plate 70 or after. Then one or more pizzas are arranged on cooking plate 70 and enclosure assembly 40 is moved to the closed position as shown in FIG. 1. The geometric design of enclosure assembly 40, for example, angle α and radii R1 and R2, is such that it provides optimal thermodynamic characteristics for cooking pizzas. The geometric design also enables the user to turn the pizzas without opening enclosure assembly 40. For example, since enclosure assembly 40 is open at front edge 52, access to the pizzas is allowed. Since the heat source is arranged in the rear of pizza oven assembly 10, for example in the rear section of the partitioned basket assembly 80, the heat therefrom must pass over the pizzas prior to exiting enclosure assembly 40, thus providing optimal cooking. The design of pizza oven assembly 10 is also advantageous in that it transforms a drum style smoker into a pizza oven or other oven-type cooking apparatus.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Pizza oven assembly
12 Drum or base
14 Lateral wall
16 Top or top edge
18 Bottom
20 Lid
22 Top surface
24 Bottom surface
26 Vent
28 Vent cover
30 Handle
32 Flange
40 Enclosure assembly
42 Section
44 Plate
46A Plate
46B Plate
48A Plate
48B Plate
50 Rear edge
52 Front edge
54 Lip
56 Bottom edge
58 Section
60 Plate
62 Plate
64A Flange
64B Flange
66 Bottom edge
70 Cooking plate
72 Top surface
74 Bottom surface
76 Flange
78A Aperture
78B Aperture
80 Basket assembly
82A Section
82B Section
82C Section
82D Section
82E Section 84A Apertures
84B Apertures
84C Apertures
84D Apertures
84E Apertures
86A Slots
86D Slots
86E Slots
88B Tabs
88C Tabs
88D Tabs
88E Tabs
90A Hook
90B Hook
92A Groove
92B Groove
94A Vertical edge
94B Vertical edge
96 Partition
100 Hinge assembly
110 Lever
112 Flanges
113 Edge
114 Through-bore
116 Through-bore
118 Bolt
120 Bracket
122 Flanges
124 Through-bore
125 Through-bore
126 Stopper pin or bolt
128 Apertures
130 Tensioner pin
132 Bottle opener/groove
134 Springs
140 Plate
AD1 Axial direction
AD2 Axial direction
CD1 Circumferential direction
CD2 Circumferential direction
R1 Radius
R2 Radius
S Space
α Angle
β Angle

What is claimed is:

1. A pizza oven assembly, comprising:
a base comprising a lateral wall forming a top;
a cooking plate arranged on the top;
a hinge assembly operatively arranged to hingedly connect an enclosure assembly to the base, the hinge assembly having;
a bracket fixedly secured to the base and having a plurality of apertures;
a lever fixedly secured to the enclosure assembly, the lever being rotatably connected to bracket; and,
at least one spring connecting to the bracket and the lever and imparting a biasing force on the lever in a first circumferential direction, the spring being connected to the bracket via a tensioner pin, the tensioner pin engaged with one of the plurality of apertures, the biasing force being adjustable based on which aperture of the plurality of apertures the tensioner pin is engaged with; and,
a basket assembly:
operatively arranged to hold an energy source to be burned;
including at least one hook arranged to removably connect the basket assembly to the base; and,
arranged within the lateral wall beneath the cooking plate.

2. The pizza oven assembly as recited in claim 1, wherein the enclosure assembly comprises:
a first planar plate;
a first curvilinear plate connected to the first plate;
a second curvilinear plate connected to the first plate, opposite the first curvilinear plate; and,
a second planar plate connected to the first planar plate, the second planar plate arranged at an angle with respect to the first planar plate.

3. A pizza oven assembly, comprising:
a container including a closed bottom, a lateral wall extending from the closed bottom, and a top edge formed by the lateral wall opposite the closed bottom;
a hinge assembly, including:
a bracket fixedly secured to the container having a plurality of apertures, each aperture of the plurality of apertures being spaced apart in an axial direction; and,
lever rotatably connected to the bracket;
an enclosure assembly fixedly secured to the lever, the enclosure including:
a planar top plate;
a first curvilinear side plate connected to the top plate;
a second curvilinear side plate connected to the top plate opposite the first curvilinear side plate; and,
a planar rear plate connected and arranged at an angle relative to the top plate, the angle being greater than zero; at least one spring connected at a first end to the bracket and at a second end to the lever, the at least one spring imparting a biasing force on the lever with respect to the bracket in a first circumferential direction, the spring is connected to one of the plurality of apertures via a pin, wherein the biasing force is adjustable by selectively engaging the pin with the plurality of apertures;
a cooking plate connected to the top edge; and,
a basket assembly arranged inside the container under the cooking plate and removably connected to the top edge.

4. The pizza oven assembly recited in claim 3, wherein the container is a cylindrical drum and the top edge of the lateral wall forms an open top.

* * * * *